May 30, 1950  M. C. LIBERT  2,509,775
BEARING MOUNTING
Filed Oct. 30, 1945

INVENTOR:
Maurice C. Libert
BY Romeyn A. Spare
HIS ATTORNEY.

Patented May 30, 1950

2,509,775

UNITED STATES PATENT OFFICE 2,509,775

BEARING MOUNTING

Maurice C. Libert, San Francisco, Calif., assignor to General Motors Corporation, Detroit, Mich., a corporation of Delaware Application October 30, 1945, Serial No. 625,570

12 Claims. (Cl. 308—189)

This invention relates to bearing mountings and comprises all of the features of novelty herein disclosed. An object of the invention is to provide an improved bearing mounting to provide for relative rotation of a shaft and a supporting or supported casing. Another object is to provide improved means to facilitate removal of antifriction bearings from a shaft. Another object is to provide means to support or centralize a shaft in its casing when one or more of its bearings is removed, as to avoid damage to a rotor or other parts carried by the shaft or adjacent thereto. Still another object is to provide an improved cartridge mounting for the bearings of an electric motor or the like.

Figure 1:
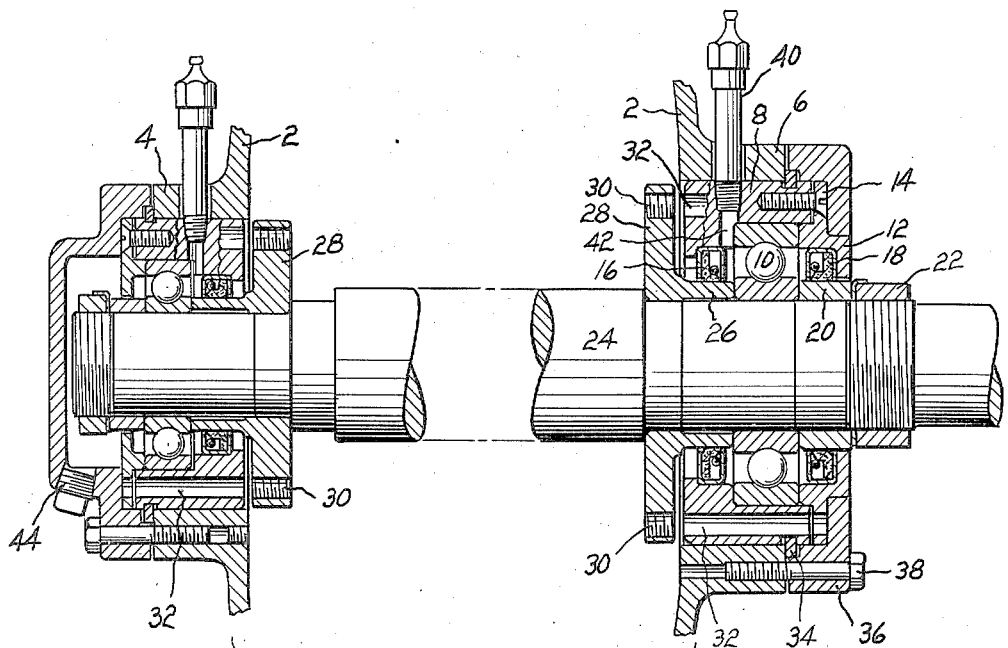

To these ends and also to improve generally upon devices of this character, the invention consists in the various matters hereinafter described and claimed. In its broader aspects the invention is not necessarily limited to the specific construction selected for illustrative purposes in the accompanying drawings in which Fig. 1 is a sectional view of a shaft mounting, a portion of the casing being broken away.

Figure 2:
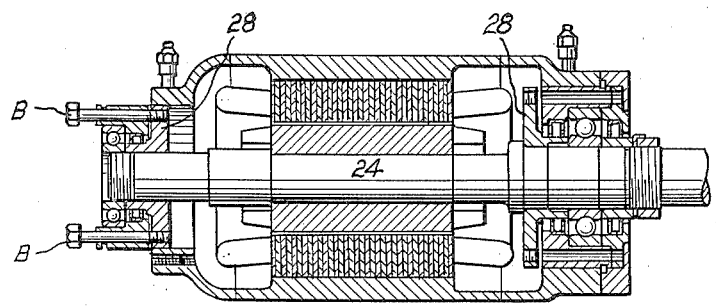

Fig. 2 is a similar view to smaller scale, one of the bearings and its housing being shown in a partially removed position.

Supporting walls such as the end bells 2 of an electric motor or other casing are indicated as terminating in flanges 4 and 6, the flange 4 preferably having the smaller bore. Slidably mounted in each bore is a cartridge or bearing housing 8 for a ball bearing 10 whose outer race ring is clamped by a cover plate 12 fastened with a series of screws 14. An oil seal 16 is contained in the body of the housing and another seal 18 in the cover plate. The seal 18 bears on a spacer 20 which is interposed between the inner race ring and a clamping nut 22 threaded on an armature shaft 24. The seal 16 bears on the sleeve portion 26 of a centering and pull-off plate 28 which is interposed between the inner race ring and a shoulder on the shaft. The inner race ring preferably has a press fit on the shaft. The plate 28 extends outwardly alongside of the bearing housing and its outer diameter is substantially the same as the bore which supports the bearing housing. The plate has a pair of diametrically opposite tapped holes 30 which are aligned with a pair of holes 32 in the body of the cartridge and its cover plate. The holes allow insertion of pull off bolts or the like, as will appear, for stripping the bearing and cartridge from the shaft.

The body of the bearing housing or cartridge 8 is provided with a peripheral groove adapted to receive a split ring 34 which is preferably made in two sections for easy insertion in the groove when the motor is not easily accessible. A flanged end cap 36 having a recess for the split ring surrounds the end of the cartridge and its cover plate and is removably clamped to the flange 6 by bolts 38. Each end bell flange has a slot for a lubricating pipe 40 which is threaded in the cartridge in registration with a radial passage 42 leading to the interior of the bearing. The bearing can be purged of deteriorated grease by forcing the grease through the seal.

It will be understood that the pipe 40 and the screws 14 are circumferentially spaced from the two holes 32. At the left or blind end of the motor housing, the cap is imperforate except at a drain plug 44 for the old grease purged from the bearing and there is no seal at the left of the corresponding bearing. In other respects, the two ends are constructed alike except for the size.

The bearings and associated housing parts can be assembled on the shaft for preliminary tests and balancing on the bearing housings or cartridges prior to inserting the assembled parts through the larger end bell. The diameter of each centering plate 28 is very slightly less than the bore of the corresponding end bell flange and hence can be left in the bore at the position indicated at the left of Fig. 2 to support the armature shaft as soon as the centering plate has been pulled axially far enough to loosen the inner race ring. Thus damage to the rotor, field pieces and windings is prevented. To effect the removal of the bearing and the cartridge at either end, it is only necessary to remove the nut 22, the cap 36 and the lubricating pipe 40, the pull off bolts B then being inserted through the holes 32 and threaded in the holes 30 of the combined pull-off and centering plate 28 whereupon the bolts are moved axially by any suitable means.

I claim:

1. In a device of the character indicated, a shaft, a supporting wall having a bore, a bearing housing fitting in the bore and having a pair of openings, a bearing between the housing and the shaft, and a bearing pull-off plate mounted on the shaft at one side of the bearing and having a pair of openings adapted to receive pull-off members inserted through the housing openings.

2. In a device of the character indicated, a shaft, a supporting wall having a bore, a bearing housing fitting in the bore and having a pair of openings, a bearing between the housing and the shaft, and a bearing pull-off plate mounted on the shaft at one side of the bearing, the plate having a portion extending outwardly alongside of the housing into proximity with the openings for cooperation with pull-off members inserted through the openings from the opposite side of the housing.

3. In a device of the character indicated, a shaft, a supporting wall having a bore, a bearing housing slidably fitting in the bore and having a pair of openings, an antifriction bearing between the housing and the shaft, and a bearing pull-off plate mounted on the shaft and having a sleeve portion engaging the inner race ring of the bearing, and the plate having a pair of threaded openings adapted to receive pull-off bolts inserted through the housing openings.

4. In a device of the character indicated, a shaft, a supporting wall having a bore, a bearing housing slidably fitting in the bore, a bearing between the housing and the shaft, and a centering plate mounted on the shaft at one side of the bearing and its housing, the diameter of the centering plate being substantially the same as the bore to support the shaft therefrom when the bearing housing and its bearing are removed.

5. In a device of the character indicated, a shaft, a supporting wall having a bore, a bearing housing slidably fitting in the bore, a bearing between the housing and the shaft, a combined centering and pull-off plate slidably mounted on the shaft at one side of the bearing and its housing, the diameter of the centering plate being substantially the same as the bore, the housing having openings outside of the bearing, and the plate having openings adapted to receive pull-off members inserted through the housing openings.

6. In a device of the character indicated, a shaft, a supporting wall having a bore, a bearing housing slidably fitting in the bore, an antifriction bearing between the housing and the shaft, a bearing pull-off plate having a sleeve portion engaging the inner race ring of the bearing, a seal interposed between the sleeve portion and the housing, the plate having an outwardly extending portion provided with openings alongside of the housing, and the housing having openings at the same distance from the shaft as the plate openings.

7. In a device of the character indicated, a shaft, a supporting wall having a bore, a bearing housing slidably fitting in the bore, an antifriction bearing between the housing and the shaft, a cover plate secured to the housing and engaging the outer race ring of the bearing, the housing and the cover plate having registering openings extending through them outside of the bearing, a bearing pull-off plate slidably mounted on the shaft at one side of the bearing and its housing, and the pull-off plate having openings adapted to register with the openings in the bearing housing and its cover plate.

8. In a device of the character indicated, a shaft, a supporting wall having a bore, a bearing housing slidably fitting in the bore, an antifriction bearing between the housing and the shaft, a cover plate secured to the housing, the housing and the cover plate having registering openings extending through them outside of the bearing, a bearing pull-off plate slidably mounted on the shaft at one side of the bearing and extending outwardly into proximity with the openings, and a cap removably secured to the supporting wall and having a flange closing the openings in the cover plate.

9. In a device of the character indicated, a shaft, a supporting wall having a bore, a bearing housing slidably fitting in the bore, an antifriction bearing between the housing and the shaft, the inner race ring of the bearing having a press-fit on the shaft, and a pull-off plate interposed between the inner race ring and a shoulder on the shaft, the plate having a portion extending outwardly alongside of the housing out of contact therewith.

10. In a device of the character indicated, a shaft, a supporting wall having a bore, an antifriction bearing interposed between the shaft and the bore, a centering plate mounted on the shaft alongside of the inner race ring, the plate having a portion extending outwardly to a diameter substantially the same as the bore to support the shaft from the bore when the bearing is removed therefrom, and means providing for access of a tool to the centering plate to press the latter against the bearing and loosen it for such removal while the shaft remains in supported position.

11. In a device of the character indicated, a shaft, a supporting structure having a bore, an antifriction bearing interposed between the shaft and the bore and having its inner race ring press-fitted on the shaft, a pull-off plate at one side of the bearing and extending outwardly beyond the outer race ring of the bearing, and the supporting structure having openings outside of the bearing to provide for access of pull-off members to the plate from the opposite side of the bearing.

12. In a device of the character indicated, a pair of spaced supporting walls having concentric bores, a bearing housing for sliding support in each bore, a shaft, a bearing between each housing and the shaft, and a pair of centering plates mounted on the shaft between the bearings, each plate lying alongside one of the bearings and its housing and having an external diameter substantially the same as the corresponding bore, to support the shaft from the bore when a bearing and its housing are removed from the shaft, and each housing having an opening providing for access to a centering plate from that side of the bearing opposite to the centering plate to loosen the bearing for such removal from the shaft while the shaft remains in supported position.

MAURICE C. LIBERT.

REFERENCES CITED

The following references are of record in the file of this patent:

UNITED STATES PATENTS

| Number | Name | Date |
|---|---|---|
| 1,792,618 | VanDerhoef | Feb. 17, 1931 |
| 1,908,295 | Leister | May 9, 1933 |
| 1,956,237 | Hughes | Apr. 24, 1934 |
| 2,329,151 | Brady | Sept. 7, 1943 |